United States Patent
Haber et al.

(10) Patent No.: US 10,778,441 B2
(45) Date of Patent: *Sep. 15, 2020

(54) REDACTABLE DOCUMENT SIGNATURES

(71) Applicant: HEWLETT PACKARD ENTERPRISE DEVELOPMENT LP, Houston, TX (US)

(72) Inventors: Stuart Haber, Princeton, NJ (US); William G. Horne, Princeton, NJ (US); Miaomiao Zhang, Jersey City, NJ (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/260,808

(22) Filed: Jan. 29, 2019

(65) Prior Publication Data
US 2019/0158296 A1  May 23, 2019

Related U.S. Application Data

(63) Continuation of application No. 15/302,980, filed as application No. PCT/US2014/033366 on Apr. 8, 2014, now Pat. No. 10,237,074.

(51) Int. Cl.
*H04L 29/06* (2006.01)
*H04L 9/32* (2006.01)
(Continued)

(52) U.S. Cl.
CPC .......... *H04L 9/3247* (2013.01); *G06F 16/93* (2019.01); *G06F 21/64* (2013.01); *H04L 9/3242* (2013.01); *G06F 2221/2123* (2013.01)

(58) Field of Classification Search
CPC ...... H04L 9/3247; H04L 9/3242; G06F 21/64
See application file for complete search history.

(56) References Cited

U.S. PATENT DOCUMENTS 7,536,635 B2  5/2009  Racovolis et al.
10,237,074 B2 *  3/2019  Haber .................. G06F 21/64
(Continued)

FOREIGN PATENT DOCUMENTS

EP  1843514 A2  10/2007
EP  1848514 A2  10/2007
WO  2006/050253 A2  5/2006

OTHER PUBLICATIONS

Shai Halevi et al., "Practical and Provably-Secure Commitment Schemes from Collision-Free Hashing," CRYPTO '96, Lecture Notes in Computer Science 1109. pp. 201-215, Springer-Verlag 1998.

(Continued)

*Primary Examiner* — Chau Le
*Assistant Examiner* — Vance M Little
(74) *Attorney, Agent, or Firm* — Hewlett Packard Enterprise Patent Department

(57) ABSTRACT

In one implementation, a redactable document signature system includes an encoding engine, a reordering engine, and a signature engine. The encoding engine is to access a plurality of subdocuments of a document, to generate a plurality of commitment values from the plurality of subdocuments, and to generate a plurality of dummy values. Each dummy value is indistinguishable from a commitment value. The reordering engine is to define an order of the plurality of commitment values and the plurality of dummy values independent of an order of the subdocuments. The signature engine is to calculate a signature value for the document using the plurality of commitment values and the plurality of dummy values according to the order.

15 Claims, 10 Drawing Sheets

(51) Int. Cl.
G06F 16/93 (2019.01)
G06F 21/64 (2013.01)

(56) References Cited

U.S. PATENT DOCUMENTS

| | | |
|---|---|---|
| 2008/0104407 A1 | 5/2008 | Horne et al. |
| 2008/0216151 A1 | 9/2008 | Miyazaki et al. |
| 2008/0294903 A1 | 11/2008 | Miyazaki et al. |
| 2009/0070361 A1 | 3/2009 | Haber et al. |
| 2010/0263060 A1 | 10/2010 | Charbonneau et al. |
| 2012/0272323 A1 | 10/2012 | Swaminathan |

OTHER PUBLICATIONS

Shafi Goldwasser et al., "A Digital Signature Scheme Secure Against Adaptive Chosen-Message Attacks," SIAM J Computing, Apr. 1988, pp. 281-308, vol. 17, No. 2, Society for Industrial and Applied Mathematics.
Ron Steinfeld et al., "Content Extraction Signatures," ICISC 2001, Dec. 6-7, 2001, Seoul, South Korea, pp. 285-304.
Robert Johnson et al., "Homomorphic Signature Schemes," CT-RSA '02, 2002, pp. 244-262, Springer-Verlag.
Ralph C. Merkle, "A Certified Digital Signature," CRYPTO '89, LNCS 435, 1990, pp. 218-238, Springer-Verlag Berlin Heidelberg.
Oded Goldreich et al, "How to Construct Random Functions," Journal of the Association for Computing Machinery, Oct. 1986, pp. 792-807, vol. 33, No. 4, ACM.
Kunihiko Miyazaki et al., "Digitally Signed Document Sanitizing Scheme with Disclosure Condition Control," IEICE Trans. Fundamentals, Jan. 2005, pp. 239-246, vol. E88-A, No. 1, The Institute of Electronics, Information and Communication Engineers.
Kai Sameun et al., "Redactable Signatures for Independent Removal of Structure and Content (Extended)," Feb. 9, 2012, pp. 1-19.
Jordan Brown and Douglas M, Blough, PhD , "Verifiable and Redactable Medical Documents," Georgia Inst. of Technology, Atlanta, Georgia, USA, Nov. 3, 2012, pp. 1148-1157, Available at: <ncbi.nlm.nih.gov/pmc/articles/PMC3540582/>.
International Search Report and Written Opinion received for PCT Patent Application No. PCT/US2014/033366, dated Dec. 26, 2014, 8 pages.
International Preliminary Report on Patentability received for PCT Patent Application No. PCT/US2014/033366, dated Oct. 20, 2016, 7 pages.
Haber, Stuart et al . , Efficient signature schemes supporting redaction, pseudonymization, and data deidentitication, , In: Proceedings of the 2008 ACM Symposium on Information, Computer and Communications Security (ASIACCS' 08), pp. 353-362.
Giuseppe Ateniese et al., "Sanitizable Signatures," European Symposium on Research in Computer Security, 2005, pp. 159-177, Springer-Verlag Berlin Heidelberg.
Giuseppe Ateniese and Breno de Medeiros, "On the Key Exposure Problem in Chameleon Hashes," Security in Communication Networks, 2004, pp. 165-179.
Christina Brzuska et al., "Security of Sanitizable Signatures Revisited," Proceedings of the 12th International Conference on Practice and Theory in Public Key Cryptography, 2009, pp. 317-336.
Christina Brzuska et al., "Redactable Signatures for Tree-Structured Data: Definitions and Constructions," Proceedings of International Conference on Applied Cryptography and Network Security, 2010, pp. 87-104, Springer-Verlag Berlin Heidelberg.
Ashish Kundu and Elisa Bertino, "Structural Signatures for Tree Data Structures," Proceedings of the VLDB Endowment, Aug. 2008, pp. 138-150, ACM.
Ashish Kundu and Elisa Bertino, "How to Authenticate Graphs Without Leaking," Proceedings of the 13th International Conference on Extending Database Technology, Mar. 2010, pp. 609-620, ACM.

* cited by examiner

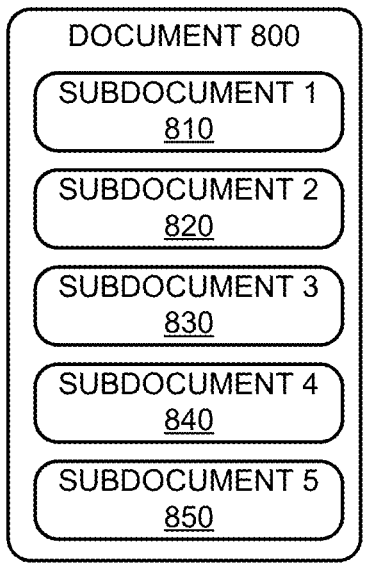
FIG. 8A
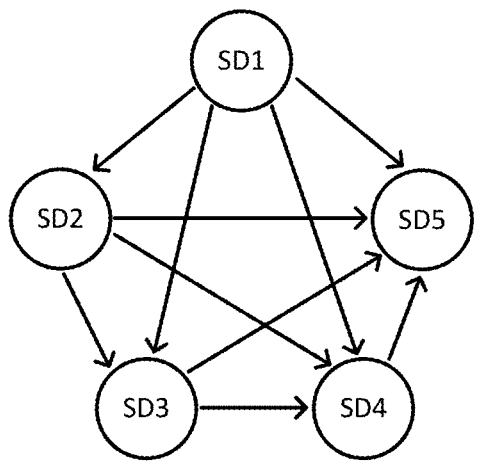
FIG. 8B
T10
| PAIR | POSITION |
|---|---|
| (SD1, SD2) | 6 |
| (SD1, SD3) | 2 |
| (SD1, SD4) | 15 |
| (SD1, SD5) | 11 |
| (SD2, SD3) | 0 |
| (SD2, SD4) | 13 |
| (SD2, SD5) | 14 |
| (SD3, SD4) | 5 |
| (SD3, SD5) | 3 |
| (SD4, SD5) | 12 |
FIG. 8C

US 10,778,441 B2

REDACTABLE DOCUMENT SIGNATURES

CROSS-REFERENCE TO RELATED APPLICATIONS

This application is a continuation of U.S. patent application Ser. No. 15/302,980, filed on Oct. 7, 2016, which is a national stage of PCT/US2014/033366 filed on Apr. 8, 2014, the entire contents of which are incorporated by reference herein. The Applicant hereby rescinds any disclaimer of claim scope in the parent application or the prosecution history thereof and advises the USPTO that the claims in this application may be broader than any claim in the parent application(s).

BACKGROUND

Redactable document signature schemes allow a document such as a file in a file system of a computing system to be redacted without invalidating a signature of the document (or document signature) using certain redaction operations. For example, some redactable document signature schemes allow some redaction operations and do not allow other redaction operations. As a specific example, some redactable document signature schemes limit which subdocuments of a document can be redacted.

Typically, a redactable document signature includes a signature value output from a signature process of a digital signature scheme to which a hash value of a document is submitted. As a basic example, a signature value can be the result of encrypting a hash value derived from a document with a private key of a public/private key pair. Additionally, a redactable document signature typically includes ancillary data used during redaction and verification of the document and redactable document signature.

BRIEF DESCRIPTION OF THE DRAWINGS

FIGS. 8A-8I are an illustration of data structures for a redactable document signature process, according to an implementation.

DETAILED DESCRIPTION

Some redactable document signature schemes rely on aggregate signature schemes using pairing-based cryptography using bilinear maps from algebraic geometry. Such redactable document signature schemes can be computationally complex, which discourages their widespread application.

Implementations of redactable document signature systems and methodologies discussed herein provide redactable document signatures (or signatures as used herein) that can be generated and verified in a computationally efficient manner. Additionally, documents signed using such systems and methodologies can be redacted in a computationally efficient manner. Moreover, some implementations discussed herein support redactable document signatures that do not disclose the locations within a document or length of a subdocument (or subdocuments) that have been redacted from that document.

Figure 1:
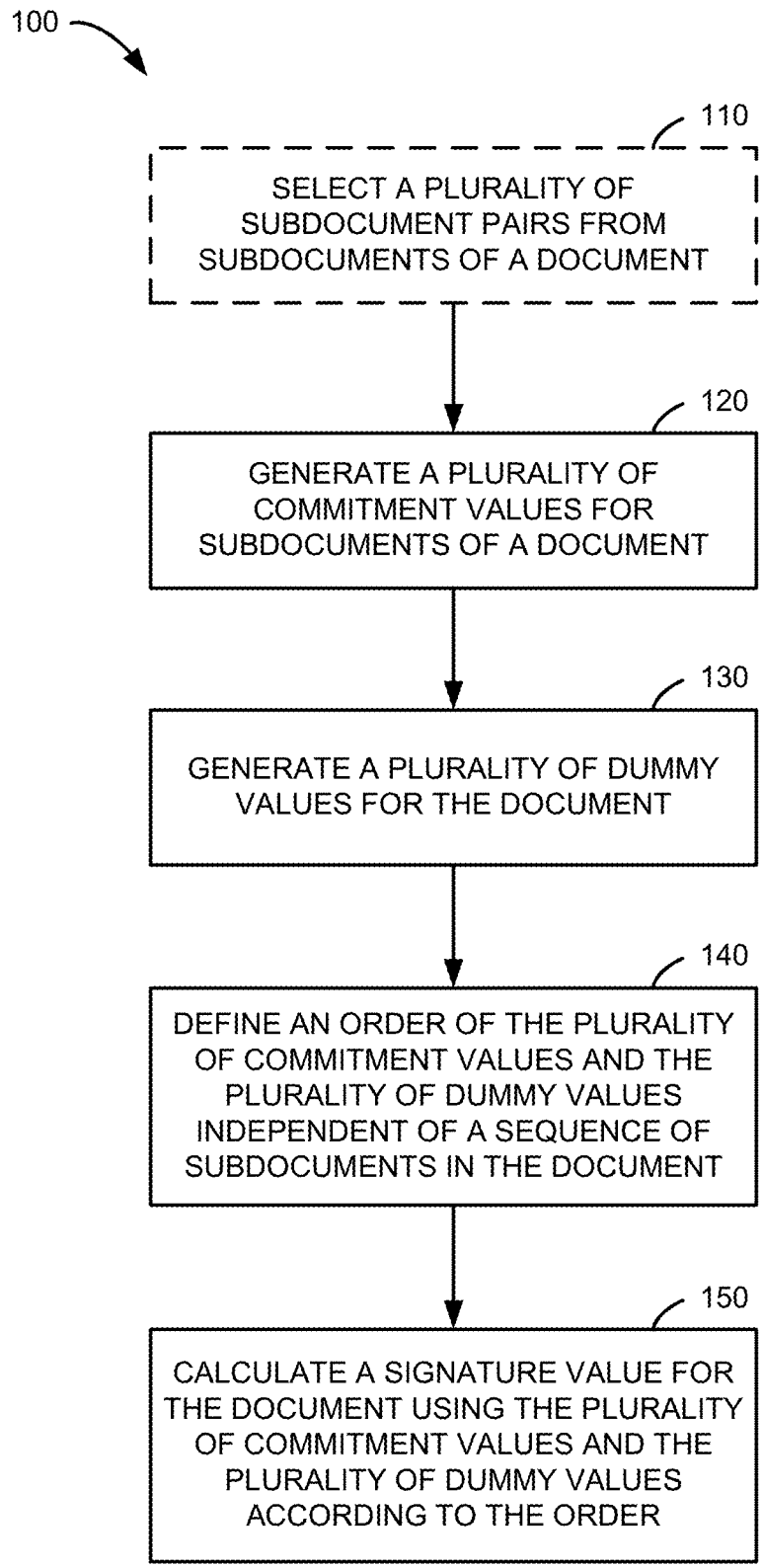
FIG. 1 is a flowchart of a redactable document signature process to generate a redactable document signature, according to an implementation.

FIG. 1 is a flowchart of a redactable document signature process to generate a redactable document signature, according to an implementation. Process 100 can be implemented, for example, at a redactable document signature system such as redactable document signature system 200 illustrated in FIG. 2. Additionally, functionalities or actions described herein as being performed by process 100 should be understood to be performed by a host (e.g., a computing system) or redactable document signature system implementing process 100. Block 110 is a step of process 100 that is included in a particular example implementation of a redactable document signature process and will be discussed after blocks 120-150 are introduced.

A plurality of commitment values are generated for subdocuments of a document at block 120. A document is a data set stored within a memory. For example, a file stored within a file system of a memory of a computing system is a document. As specific examples, a document can be a text file, an image file, a video file, an audio file, or other data file. A subdocument is a portion of a document. For example, a subdocument can be a number of consecutive bits or bytes of a document (e.g. 8×8 blocks of pixels of an image). As another example, a subdocument can be a number of symbols of a document such as ASCII characters or Unicode characters of a document, for example words, sentences, or paragraphs. As yet another example, a subdocument can be a section of a document such as an element of a markup document (e.g., one or more elements of an Extensible Markup Language (XML) document).

In some implementations, subdocuments of a document are of the same size or length (i.e., each subdocument of a document has a common size or length). In other implementations, subdocuments of a document can have different sizes or lengths. That is, in such implementations subdocuments of a document can have unequal sizes or lengths.

A commitment value is a value derived or generated from a subdocument that is statistically, probabilistically, or otherwise effectively unique to that subdocument while hiding the contents. In other words, the probability that commitment values derived (or calculated) from different subdocuments are the same is negligible for the application. For example, a commitment value can be an output of a hash function such as a one-way hash function or cryptographically secure hash function applied to a subdocument and some random input. In other words, a commitment value can be generated from a hash function. In some implementations, a commitment value is randomized by, for example, deriving the commitment value from a subdocument and one or more random values. As used herein, the terms "random" and "randomly" mean truly random or pseudorandom and truly randomly or pseudorandomly, respectively.

In some implementations, and discussed in more detail below, a commitment value is derived from more than one subdocument. Moreover, such a commitment value can be derived from an ordered pair of subdocuments of a document. As a specific example, a subdocument, a subsequent subdocument (i.e., following or immediately following the subdocument in the order of the subdocuments in the document), and a random value can be concatenated and input to a hash function to generate a commitment value. Alternatively, the subdocument and the subsequent subdocument can each be input separately to one or more hash functions to generate a hash value for each of the subdocument and the subsequent subdocument. The hash values for the subdocument and the subsequent subdocument can then be concatenated—in that order—and input with a random value to a hash function to generate a commitment value. Such a commitment value can be said to be for or associated with the subdocument, the subsequent subdocument, and/or the subdocument pair including the subdocument and the subsequent subdocument. As used herein, the term "subdocument pair" means two or more subdocuments.

Referring again to FIG. 1, the number of commitment values generated at block 120 varies by implementation. In some implementations, one commitment value is generated for each subdocument of a document. In other implementations, subdocuments of the document are arranged into subdocument pairs and one commitment value is generated for each subdocument pair. As a specific example, a subdocument pair includes two subdocuments, and one commitment value is generated for each ordered combination of subdocuments of the document as subdocument pairs. Said differently, only one subdocument pair includes any two subdocuments, and the subdocuments in each subdocument pair are used to generate the commitment value in the order of the subdocuments in the document (e.g., are provided to a hash function in the order of appearance in the document).

At block 130, a plurality of dummy values is generated for the document. Dummy values can prevent analysis of the signature from revealing which or the number of subdocuments that have been redacted from a document. Dummy values are values that are indistinguishable from commitment values. As used herein in the context of dummy values and commitment values, the term "indistinguishable" means that a value cannot be determined to be a dummy value or a commitment value by analysis of that value, dummy values, and/or commitment values. Said differently, a dummy value is indistinguishable from a commitment value (or commitment values) if it is infeasible (e.g., computationally infeasible) to distinguish that dummy value from one or more commitment values by analysis of that dummy value and/or the one or more commitment values. For example, dummy values have an identical (or common) size or length (e.g., number of bits, bytes, or symbols), probability of values, or other traits to those of commitment values for a particular implementation.

As an example, a dummy value can be generated using a one-way hash function that is also used to generate a commitment value. The hash function accepts one or more input values and outputs known-length hash values from which determining the input value(s) is computationally infeasible. As a specific example, a subdocument and a random value are input to the hash function to generate a commitment value. A random value and some additional data (e.g., a predetermined data set) are then input to the hash function to generate a dummy value. The commitment value and dummy value are different values that have a common length. Because it is infeasible to determine the input values used by the hash-function to generate the commitment value and the dummy value, the dummy value and the commitment value are, of themselves, indistinguishable.

The number of dummy values generated at block 130 can vary by implementation. In some implementations, the number of dummy values generated at block 130 can be selected to cause the sum of the number of dummy values generated at block 130 and the number of commitment values generated at block 120 to be a power of two. In other implementations, the number of dummy values generated at block 130 can be selected to cause the sum of the number of dummy values generated at block 130 and the number of commitment values generated at block 120 to be a particular number or number with particular traits for calculating a signature value for a document.

An order of the plurality of commitment values generated at block 120 and the plurality of dummy values generated at block 130 is determined at block 140. Said differently, an order according to which the plurality of commitment values and the plurality of dummy values will be arranged in a sequence is determined at block 140. The order of the plurality of commitment values and the plurality of the dummy values can obfuscate which values in the sequence are dummy values and which are commitment values. For example, the commitment values and the dummy values can be randomly ordered in the sequence. Because the dummy values are indistinguishable from the commitment values, the sequence of the plurality of commitment values and the plurality of the dummy values does not identify which values are commitment values and which values are dummy values.

As illustrated in FIG. 1, the order of the commitment values is independent of the order of the subdocuments in the document. In other words, the relative ordering of commitment values in the order does not depend on the order of the subdocuments in the document used to generate those commitment values. More specifically, the relative ordering of a commitment value associated with a previous subdocument and a commitment value associated with a subsequent subdocument is determined without reference to the order of those subdocuments in the document. In some implementations, the order of the plurality of commitment values generated at block 120 and the plurality of dummy values generated at block 130 determined at block 140 is random.

In some implementations, a commitment value map is also defined for the commitment values. A commitment value map includes at least one entry for each subdocument that has not been redacted from a document. Each entry of the commitment value map identifies the subdocument or subdocuments used to generate a commitment value and the position (or location) of that commitment value in the order defined at block 140. For example, each entry of the commitment value map can include an identifier such as an index of the subdocument or subdocuments used to generate a commitment value and an identifier such as an index or position of that commitment value in the order defined at block 140.

A signature value for the document is then calculated using the plurality of commitment values and the plurality of dummy values according to the order defined at block 150. Said differently, the plurality of commitment values and the plurality of dummy values are arranged in a sequence according to the order, and the signature value is calculated from the sequence. As a specific example, the plurality of commitment values and the plurality of dummy values can be assigned to leaf nodes of a binary hash tree such as a Merkle tree according to the order. The signature value for the document can then be calculated by ascending the binary hash tree, as follows.

As an example, an intermediate hash value is calculated for each node in the binary hash tree. At the leaf nodes, the intermediate hash values are commitment values and dummy values assigned to the leaf nodes according to the order. At each sub-root node above the leaf nodes, the intermediate hash values are generated by combining the values (i.e., intermediate hash values) at the child nodes of that sub-root node as input to a hash function. The output of the hash function is the intermediate hash value for that node. The intermediate hash value at the root of the binary hash tree can be used to generate the signature value for the document.

For example, the intermediate hash value at the root of the binary hash tree can be submitted to a signature process of a digital signature scheme, and the output of the signature process can be the signature value. As a simple example, the intermediate hash value at the root of the binary hash tree can be encrypted with a private key of a public/private key pair, and the encrypted intermediate hash value at the root of the binary hash tree can be the signature value.

In some implementations, the signature for a document is the signature value calculated at block 150. In other implementations, the signature for a document includes the signature value calculated at block 150, a commitment value map, a set of values related to random values used to generate commitment values, and/or a set of intermediate hash values related to the dummy values generated at block 130. This ancillary information can be used, as discussed in more detail below, to redact and/or verify the document.

In some implementations, the set of values related to random values used to generate commitment values are those random values. In some implementations, the set of values related to random values used to generate commitment values can include values from which those random values can be generated (or derived). In other implementations, the set of values related to random values used to generate commitment values are a set of values that cover those random values in a tree structure. As used herein, a value associated with a node in a tree structure covers another value or values associated with descendant nodes of that node if that value is at a leaf node of the tree structure (i.e., the node has no descendant nodes and the value covers itself) or can represent the other value or values for some application. Thus, if the value of a node can represent the values of its descendant nodes for a particular purpose, then that value can be said to cover the values of the descendant nodes for that application.

As an example, the value of a sub-root node that is generated from the values of descendent nodes of that sub-root node covers those descendent nodes. As a specific example, the value of a sub-root node of a Merkle tree covers the values of the descendent nodes of that sub-root node.

As another example, the value of a sub-root node within a tree structure that can be used to generate the values of descendent nodes of that sub-root node covers the values of those descendent nodes. As a specific example, the random values used to generate commitment values and dummy values can be associated with leaf nodes of a binary tree. A set of values related to random values used to generate commitment values can include values of nodes that cover the leaf nodes associated with random values used to generate commitment values and do not cover the leaf nodes associated with random values used to generate dummy values.

In some implementations, a set of intermediate hash values related to the dummy values are the dummy values or are values calculated from the dummy values, but not from commitment values. In other implementations, a set of intermediate hash values related to the dummy values cover the dummy values. For example, a set of intermediate hash values related to the dummy values can be values assigned to sub-roots of a binary hash tree that depend (e.g., are calculated from) exclusively from dummy values. In other words, the set of intermediate hash values related to the dummy values can include intermediate hash values assigned to sub-roots of a binary hash tree that have no descendant leaf nodes to which commitment values were assigned (e.g., at block 150). Such intermediate hash values are generated from dummy values, but not from commitment values. Additionally, such intermediate hash values cover the dummy values because the signature value in the example discussed in relation to block 150 above can be calculated from these intermediate hash values and the commitment values without the dummy values. That is, the intermediate hash values can be used in place of the dummy values to calculate the signature value.

Process 100 illustrated in FIG. 1 is an example redactable document signature process. In other implementations, a redactable document signature process can include additional or reordered blocks. For example, the operations discussed in relation to block 140 can be performed before the operations discussed in relation to block 130 and/or the operation discussed in relation to block 120.

As another example, a redactable document signature process can include additional blocks or steps. As illustrated in FIG. 1, a plurality of subdocument pairs can be selected from subdocuments of a document at block 110. For example, the document can be represented (or modeled) as a graph with the subdocuments of the document being represented by the nodes of the graph. Subdocuments represented by nodes in the graph connected by edges can be selected as the subdocument pairs. As a specific example, the graph can be a directed graph with one edge between every pair of nodes, in which the order of the nodes (e.g., the directions of edges connecting nodes) is defined by the order of the subdocuments represented by those nodes. That is, the order of the subdocuments in the document defines the directionality of the edges between nodes representing those subdocuments in the graph. Said yet another way, the graph representation of the document is order-preserving. Additional examples of order-preserving graph representations of a document are discussed in relation to FIG. 9.

Figure 2:
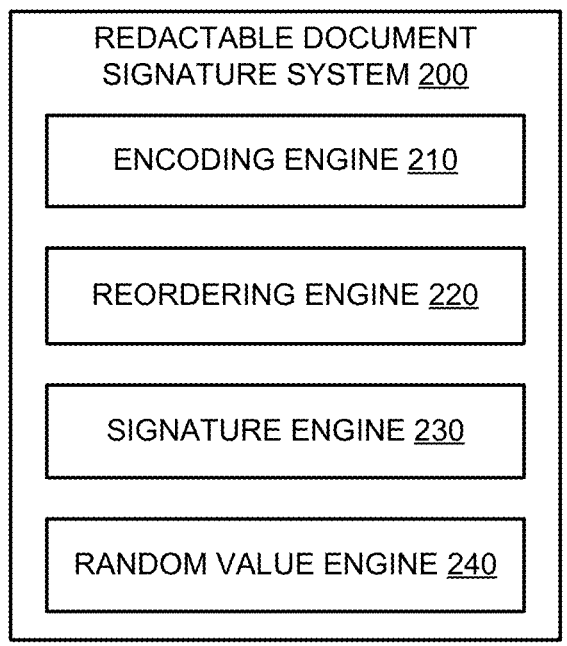
FIG. 2 is schematic block diagram of a redactable document signature system, according to an implementation.

FIG. 2 is schematic block diagram of a redactable document signature system, according to an implementation. Redactable document signature system 200 includes encoding engine 210, reordering engine 220, signature engine 230, and random value engine 240. Although particular engines (i.e., combinations of hardware and software) are illustrated and discussed in relation to redactable document signature system 200 specifically and other example implementations discussed herein generally, other combinations or sub-combinations of engines can be included within other implementations. Said differently, although engines illustrated in FIG. 2 and discussed in other example implementations perform specific functionalities in the examples discussed herein, these and other functionalities can be accomplished, implemented, or realized at different engines or at combinations of engines.

For example, two or more engines illustrated and/or discussed as separate can be combined into an engine that performs the functionalities discussed in relation to the two engines. As another example, functionalities performed at one engine as discussed in relation to these examples can be performed at a different engine or different engines. Moreover, an engine discussed herein in relation to a particular type of engine can be implemented as a different type of engine in other implementations. For example, a particular engine can be implemented using a group of electronic and/or optical circuits (or circuitry) or as instructions stored at a non-transitory processor-readable medium such as a memory and executed at a processor.

Encoding engine 210 is a combination of hardware and software that accesses subdocuments of a document. For example, the document can be received via a communications link or from a data store, and encoding engine 210 can access the subdocuments of the document at a memory of a computing system hosting redactable document signature system 200. In some implementations, encoding engine 210 selects subdocument pairs from subdocuments of a document. Encoding engine 210 generates commitment values from the accessed subdocuments, for example as discussed above in relation to block 120 of FIG. 1.

Additionally, encoding engine 210 also generates dummy values. For example, encoding engine 210 can generate dummy values that are indistinguishable from the of commitment values generated by encoding engine 210. As a specific example, encoding engine 210 can generate dummy values as discussed above in relation to block 130 of FIG. 1.

Reordering engine 220 is a combination of hardware and software that defines an order for the commitment values and the dummy values. For example, as discussed above in related to block 140 of FIG. 1, reordering engine 220 can define an order for the commitment values and the dummy values independent of an order of the subdocuments in the document.

Signature engine 230 is a combination of hardware and software to calculate a signature value for the document using the commitment values and the dummy values according to the order. For example, as discussed above in relation to block 150 of FIG. 1, signature engine 230 can implement a binary hash tree to calculate a signature value from the commitment values and the dummy values.

In some implementations, and as illustrated in FIG. 2, redactable document signature system 200 includes random value engine 240. Random value engine 240 is a combination of hardware and software that generates a set of random values for the commitment values and the dummy values. Said differently, random value engine 240 generates a set of random values, and each of the random values in the set of random values is used to generate the commitment values and the dummy values. For example, random value engine 240 can use a tree structure to implement a random value generator to generate random values used by encoding engine 210 to generate commitment values and dummy values. In some implementations, the random value from the set of random values used by encoding engine 210 to generate commitment values and dummy values are unique for each commitment value and dummy value.

As a specific example, random value engine 240 can use a GGM tree (i.e., a pseudorandom function construction such as the Goldreich, Goldwasser, and Micali pseudorandom function construction) to generate a set of random values used by encoding engine 210 to generate commitment values and dummy values. An example of a GGM tree is described by: Oded Goldreich, Shafi Goldwasser, and Silvio Micali. "How to construct random functions." J. ACM, 33(4):792-807, August 1986, which is incorporated herein in its entirety. As a specific example, a GGM tree can be used to generate random values using a binary tree structure by assigning a random value to the root node, and generating random values for the children of the root node by applying a length-doubling pseudorandom number generator such as one or more hash functions to the random value assigned to the root node. These operations can be applied at each sub-root while descending the binary tree. The leaf nodes of the binary tree—here, the GGM tree—are the set of random values.

In such an implementation, random value engine 240 can generate a GGM tree, and the values at the leaf nodes of the GGM tree are the set of random values used to generate the commitment values and the dummy values. The GGM tree can have the same number of leaf nodes as a binary hash tree used to generate a signature. In other words, the GGM tree and the binary hash tree can have the same depth and size. Thus, a one-to-one correspondence exists between the list of the leaf nodes of the GGM tree and the list of the leaf nodes of the binary hash tree.

As discussed above, leaf nodes of the binary hash tree can be associated with commitment values and dummy values according to an order determined by reordering engine 220. Each value at the leaf nodes in the GGM tree is used to generate the commitment value or dummy value associated with the corresponding leaf node of the binary hash tree. Thus, the random value used to generate each commitment value and dummy value is unique to that commitment value or dummy value.

Figure 3:
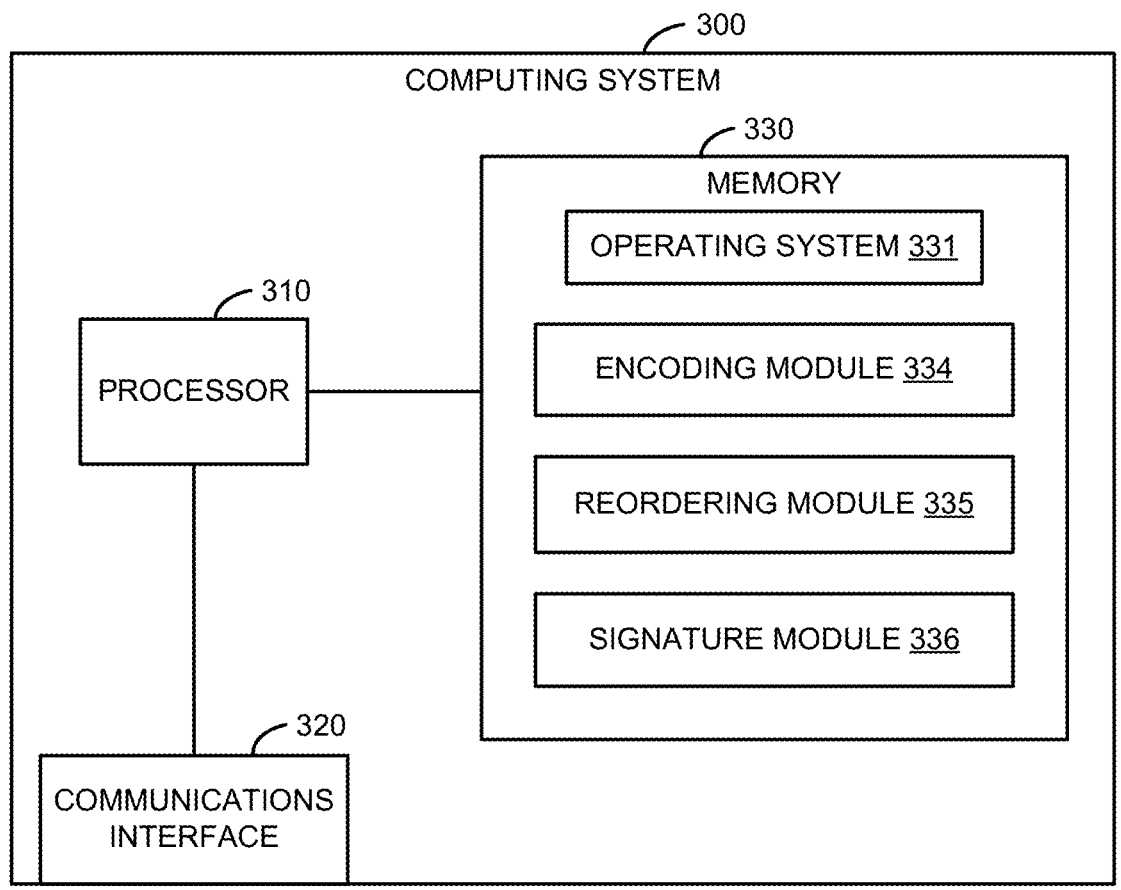
FIG. 3 is a schematic block diagram of a computing system hosting a redactable document signature system, according to an implementation.

FIG. 3 is a schematic block diagram of a computing system hosting a redactable document signature system, according to an implementation. In other words, FIG. 3 illustrates one realization of retractable document signature system 200. Computing system 300 can be, for example, a server, a notebook computer, a tablet device, a virtualized computing system, or some other computing system. In some implementations, a computing system hosting a redactable document signature system is itself referred to as a redactable document signature system.

Processor 310 is any combination of hardware and software that executes or interprets instructions, codes, or signals. For example, processor 310 can be a microprocessor, an application-specific integrated circuit (ASIC), a graphics processing unit (GPU) such as a general-purpose GPU (GPGPU), a distributed processor such as a cluster or network of processors or computing systems, a multi-core or multi-processor processor, a virtual or logical processor, or some combination thereof. As a specific example, in some implementations, processor 310 can include multiple processors such as one or more general purpose processors and one or more general-purpose GPUs.

Communications interface 320 is an engine via which processor 310 can communicate with other processors or computing systems via a communications link. As a specific example, communications interface 320 can include a network interface card and a communications protocol stack hosted at processor 310 (e.g., instructions or code stored at memory 330 and executed or interpreted at processor 310 to implement a network protocol) to receive and/or to send documents and/or signatures. As specific examples, communications interface 320 can be a wired interface, a wireless interface, an Ethernet interface, a Fiber Channel interface, an InfiniBand interface, an IEEE 802.11 interface, or some other communications interface via which processor 310 can exchange signals or symbols representing data to communicate with other processors or computing systems.

Memory 330 is one or more processor-readable media that store instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 330 can be a volatile random access memory (RAM), a persistent data store such as a hard-disk drive or a solid-state drive, a compact disc (CD), a digital versatile disc (DVD), a Secure Digital™ (SD) card, a MultiMediaCard (MMC) card, a CompactFlash™ (CF) card, or a combination thereof or of other memories. In other words, memory 330 can represent multiple processor-readable media. In some implementations, memory 330 (or some portion thereof) can be integrated with processor 310, separate from processor 310, or external to computing system 300.

Memory 330 stores instructions or codes that define encoding module 334, reordering module 335, and signature module 336. Encoding module 334, reordering module 335, and signature module 336 are software modules that when stored at memory 330 and/or executed at processor 310 implement a recording engine, a reordering engine, and a signature engine. Additionally, memory 330 can store other instructions or codes that when stored at memory 330 and/or executed at processor 310 implement a random value engine, an operating system, and/or other engines or applications.

Encoding module 334, reordering module 335, and/or signature module 336 can be accessed or installed at computing system 300 from a variety of memories or processor-readable media or via a communications network. For example, computing system 300 can access encoding module 334, reordering module 335, and/or signature module 336 at a remote processor-readable medium via communications interface 320. As a specific example, computing system 300 can be a network-boot device that accesses encoding module 334, reordering module 335, signature module 336, and/or instructions or codes that implement an operating system during a boot process. As yet another example, computing system 300 can include (not illustrated in FIG. 3) a processor-readable medium access device (e.g., a CD or DVD drive or a CF or SD card reader) to access a processor-readable medium storing encoding module 334, reordering module 335, and/or signature module 336.

Figure 4:
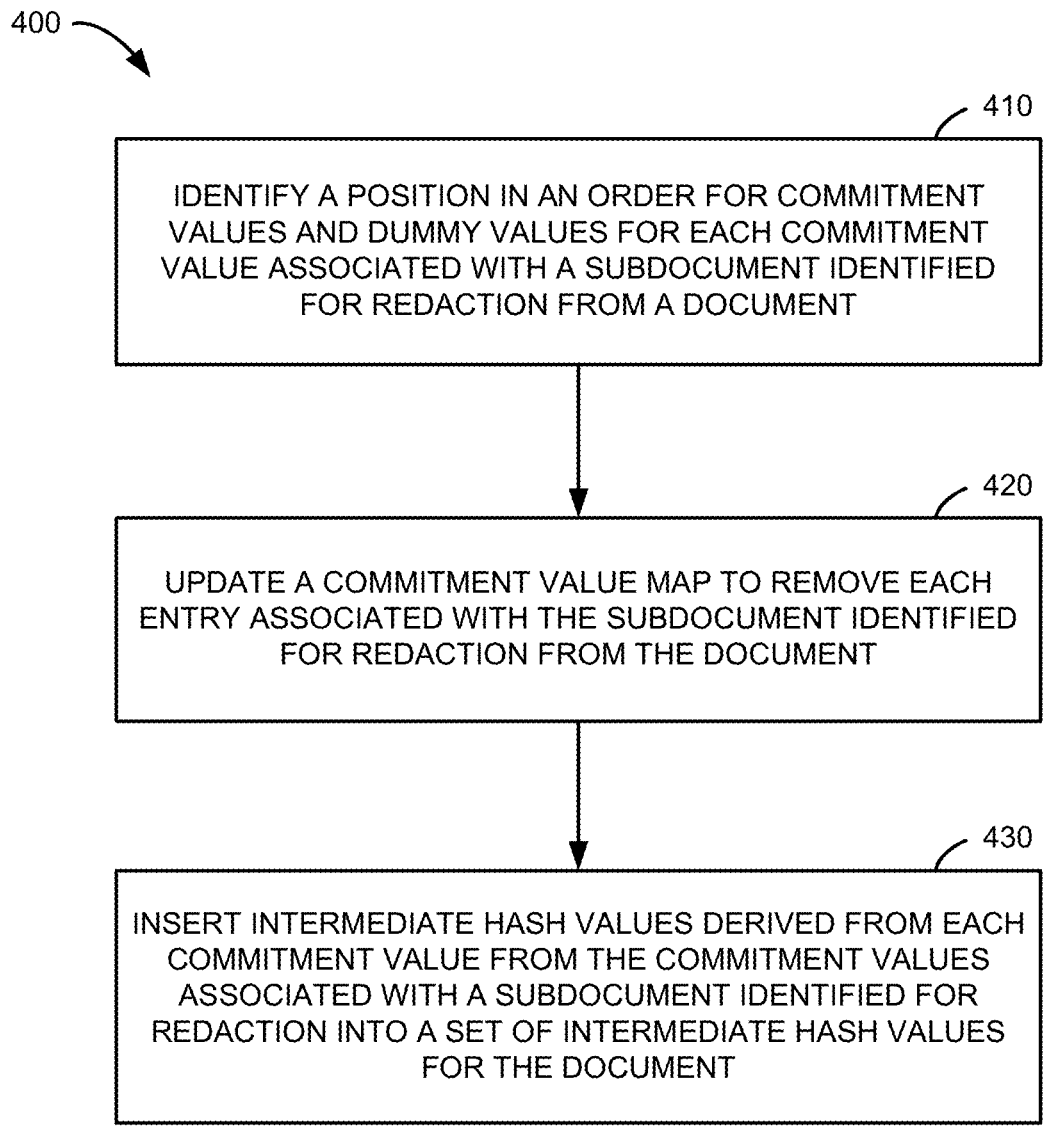
FIG. 4 is a flowchart of a redactable document signature process to redact a document, according to an implementation.

FIG. 4 is a flowchart of a redactable document signature process to redact a document, according to an implementation. Process 400 can be implemented, for example, at a redactable document signature system such as redactable document signature system 500 illustrated in FIG. 5. Additionally, functionalities or actions described herein as being performed by process 400 should be understood to be performed by a host (e.g., a computing system) or redactable document signature system implementing process 400.

A position in an order for commitment values and dummy values for each commitment value associated with a subdocument identified for redaction from a document is identified at block 410. For example, a document and a signature including a signature value, a commitment value map, a set of values related to random values used to generate commitment values, and a set of intermediate hash values related to dummy values for the document can be received or accessed by process 400. The commitment value map can be used to identify the position of each commitment value associated with a subdocument identified for redaction from a document in an order for commitment values and dummy values at block 410. As discussed above, the commitment value map can include at least one entry for each subdocument that has not been redacted from a document. Each entry of the commitment value map identifies the subdocument or subdocuments (e.g., in implementations in which commitment values are generated for subdocument pairs) used to generate a commitment value and the position (or location) of that commitment value in an order of commitment values and dummy values for the document.

The commitment value map can be parsed at block 410 to identify the position in the order of each commitment value that is to be generated from a subdocument that is identified (or selected) for redaction from the document. For example, the commitment value map can be represented as a table in which each row is associated with a commitment value. The table includes a column that identifies subdocuments that are to be used to generate the commitment value and a column that identifies a position of the associated commitment value in the order. The column that identifies subdocuments to be used to generate an associated commitment value for each value can be searched to identify an index (or other identifier) of the subdocument identified for redaction. The position of the commitment value associate with each row that includes the index of the subdocument identified for redaction in that column can be accessed at the other column.

In some implementations, the commitment values can then be generated from the subdocuments of the document using the information in the commitment value map (e.g., information identifying the subdocument or subdocuments from which each commitment value is to be generated). The commitment values can then be arranged in a sequence according to the order with intermediate hash values. That is, the commitment values can be arranged in a sequence with the intermediate hash values such that a signature value can be generated from the commitment values and intermediate hash values as discussed above in relation to FIG. 1.

As discussed above, in some implementations commitment values are generated from subdocuments and random values. In such implementations, a set of random values for commitment values can be reconstructed from a set of values related to random values used to generate commitment values included in a signature for the document. Those random values can then be used to generate the commitment values.

At block 420, the commitment value map is updated to remove each entry (e.g., row in a table representation) associated with the subdocument identified for redaction. In other words, each entry in the commitment value map that is associated with a commitment value generated from the subdocument identified for redaction is removed (or deleted) from the commitment value map.

Referring to the example above in which the commitment value map is represented as a table, the column that identifies subdocuments to be used to generate an associated commitment value for each value can be searched to identify an index of the subdocument identified for redaction. Rows that include the index of the subdocument identified for redaction in that column can be removed from the commitment value map.

Intermediate hash values are then generated for each commitment value that is associated with the subdocument identified for redaction, and those intermediate hash values are inserted into (or added to) a set of intermediate hash values for the document at block 430. For example, commitment values generated using the commitment signature map and intermediate hash values received in a signature of the document can be arranged in a binary hash tree according to the order as discussed above in relation to FIG. 1. More specifically in this example, the commitment values can be assigned to or associated with the leaf nodes of the binary hash tree using the position of each commitment value included in the commitment value map. The signature can include an index or other information identifying a node within the binary hash tree to which each intermediate hash value should be assigned.

Process 400 can then ascend the binary hash tree, calculating intermediate hash values as discussed above. Intermediate hash values that are related to (e.g., cover) the commitment values associated with the subdocument identified for redaction from the document are then added to the set of intermediate hash values. As a specific example, the set of intermediate hash values can be modified to include intermediate hash values that cover the set of intermediate hash values from the signature and intermediate hash values that cover the commitment values associated with the subdocument identified for redaction.

In some implementations, random values are used to generate the commitment values, and the random values used to generate commitment values associated with the subdocument identified for redaction are removed (or deleted). A set of values related to the remaining random values can then be generated to replace the set of values included in the signature for the document. As a specific example, a set of values that covers the random values used to generate commitment values not associated with the subdocument identified for redaction (i.e., commitment values that are not generated from the subdocument identified for redaction) replaces the set of values included in the signature for the document.

The subdocument identified for redaction can then be removed from the document, and the signature of the document includes the signature value, the commitment value as updated at block 420, and the set of intermediate hash values as modified at block 430. In some implementations, the signature also includes a set of values related to the random values used to generate commitment values not associated with the subdocument identified for redaction.

Process 400 illustrated in FIG. 4 is an example redactable document signature process. In other implementations, a redactable document signature process can include additional or reordered blocks. Some examples of such implementations have been discussed above.

Figure 5:
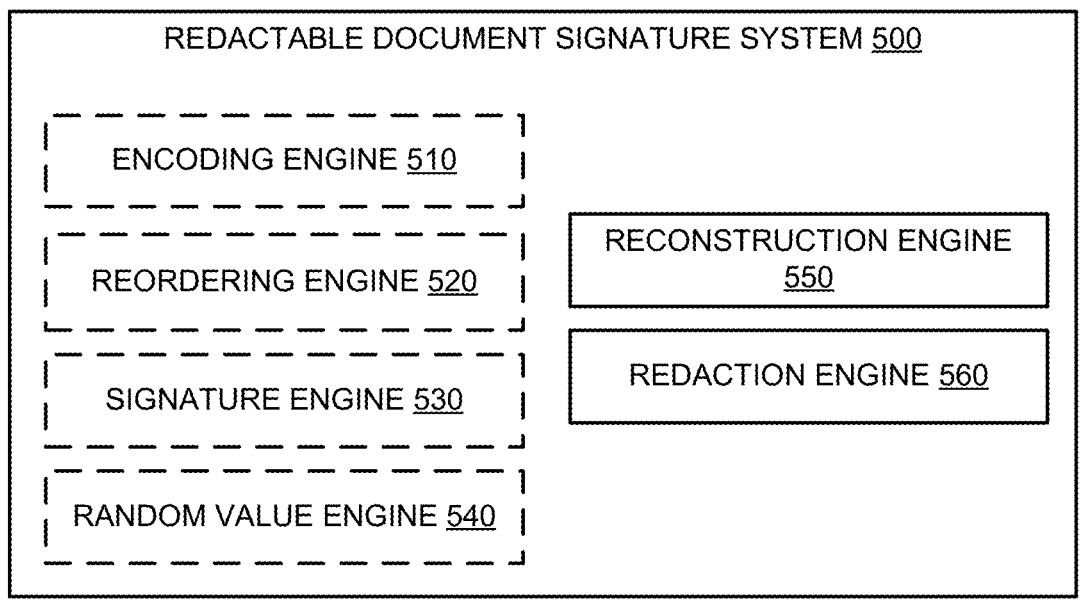
FIG. 5 is schematic block diagram of a redactable document signature system, according to another implementation.

FIG. 5 is schematic block diagram of a redactable document signature system, according to another implementation. As illustrated in FIG. 5, redactable document signature system 500 includes encoding engine 510, reordering engine 520, signature engine 530, random value engine 540, reconstruction engine 550, and redaction engine 560. Encoding engine 510, reordering engine 520, signature engine 530, and random value engine 540 are similar to encoding engine 210, reordering engine 220, signature engine 230, and random value engine 240 discussed above in relation to FIG. 2. Moreover, encoding engine 510, reordering engine 520, signature engine 530, and random value engine 540 are illustrated in dashed lines to indicate that in some implementations a redactable document signature system does not include such engines. For example, a redactable document signature system can redact documents that have been signed already (e.g., remove subdocuments from documents and modify redactable document signatures for those documents), but not generate new redactable document signatures for other documents.

Reconstruction engine 550 is a combination of hardware and software that identifies the position in the order of each commitment value that is to be generated from a subdocument that is identified (or selected) for redaction from the document. For example, reconstruction engine 550 can access and analyze or parse a commitment value map to identify the position in the order of each commitment value that is to be generated from a subdocument that is identified. Additionally, in some implementations, reconstruction engine 550 generates commitment values from the subdocuments of a document using information in a commitment value map. Reconstruction engine 550 also may arrange commitment values in a sequence according to the order with intermediate hash values.

Moreover, in some implementations reconstruction engine 550 generates commitment values from subdocuments and random values. In such implementations, reconstruction engine 550 reconstructs (or generates) a set of random values for commitment values from a set of values related to random values used to generate commitment values included in a signature for a document.

Redaction engine 560 is a combination of hardware and software that removes each entry associated with the subdocument identified for redaction from a commitment value map, for example, as discussed in relation to block 420 above. Additionally, redaction engine 560 may generate intermediate hash values for each commitment value that is associated with the subdocument identified for redaction, and insert (or add) those intermediate hash values into a set of intermediate hash values for a document.

Moreover, in some implementations, redaction engine 560 removes (or deletes) random values used to generate commitment values associated with a subdocument identified for redaction from a document from a set of random values for the document. Redaction engine 560 can then generate a set of values related to the remaining random values and replace the set of values included in a signature for the document with the newly generated set of values. Additionally, redaction engine 560 can remove the subdocument identified for redaction from the document, and define a signature for the document including a signature value previously received with a signature of the document, the modified set of values, the modified set of intermediate hash values, and the modified (or updated) commitment value map.

Figure 6:
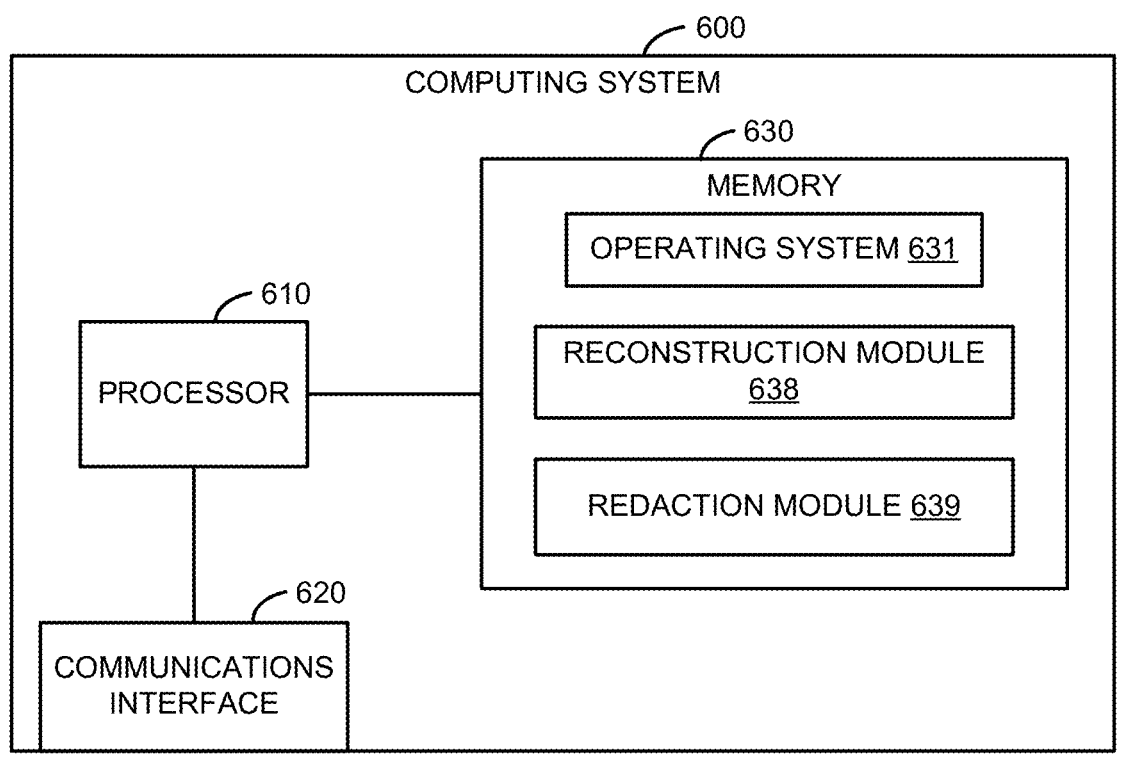
FIG. 6 is a schematic block diagram of a computing system hosting a redactable document signature system, according to another implementation.

FIG. 6 is a schematic block diagram of a computing system hosting a redactable document signature system, according to another implementation. FIG. 6 illustrates one realization of retractable document signature system 500. Computing system 600 can be, for example, a server, a notebook computer, a tablet device, a virtualized computing system, or some other computing system. In some implementations, a computing system hosting a redactable document signature system is itself referred to as a redactable document signature system.

Computing system 600 is similar to computing system 300 discussed above in relation to FIG. 3. That is, processor 610, communications interface 620, and memory 630 are similar to processor 310, communications interface 320, and memory 330, respectively. In the example illustrated in FIG. 6, memory 630 does not include an encoding module, a reordering module, a signature module, or a random value module. Rather, memory 630 includes instruction or codes that implement reconstruction module 638 and redaction module 639. Reconstruction module 638 and redaction module 639 are software modules that when stored at memory 630 and/or executed at processor 610 implement a reconstruction engine and a redaction engine.

Figure 7:
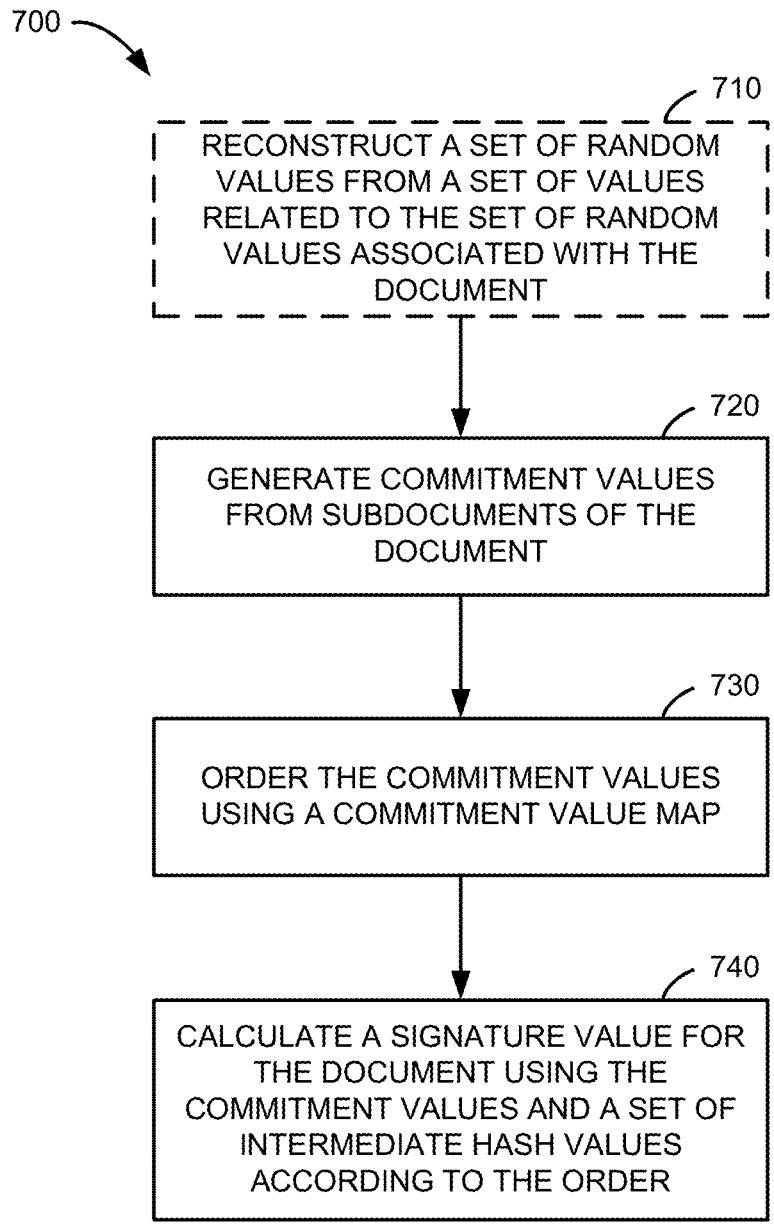
FIG. 7 is a flowchart of a redactable document signature process to verify a document, according to an implementation.

FIG. 7 is a flowchart of a redactable document signature process to verify a document, according to an implementation. In other words, process 700 can be used to verify that a document satisfies a signature for that document. Process 700 can be implemented, for example, at a redactable document signature system. Additionally, functionalities or actions described herein as being performed by process 700 should be understood to be performed by a host (e.g., a computing system) or redactable document signature system implementing process 700.

Commitment values are generated from subdocuments of a document at block 720. For example, a document and a signature for that document can be received (e.g., via a communications interface operatively coupled to a communications link) and commitment values can be generated from subdocuments of the document as discussed in other examples herein. For example, the commitment values can be generated from subdocument pairs of the subdocument using a hash function.

Process 700 illustrated in FIG. 7 is an example redactable document signature process. In other implementations, a redactable document signature process can include additional or reordered blocks. For example, in some implementations as illustrated by the dashed lines of block 710, the commitment values can be generated using subdocuments and random values. A signature for the document can include a set of values related to (e.g., that cover) a set of random values associated with the document. The set of random values can be reconstructed (or generated) from the set of values included in the signature at block 710. In some implementations, the set of values included in the signature can be the set of random values. These random values can then be used to generate the commitment values at block 720.

As a specific example, the set of values can include value for sub-root nodes or leaf nodes of a GGM tree. Moreover, in some implementations, a signature of a document can include additional information such as metadata related to the set of values that describes the GGM tree and/or the locations of nodes within the GGM tree to which each value from the set of values is related. The set of values can be assigned to the sub-root nodes and leaf nodes of the GGM tree, and the reconstructed portion of the GGM tree can then be used to generate random values for commitment values at leaf nodes of the GGM tree from the values assigned to the sub-root nodes.

The commitment values are then arranged in a sequence according to an order for the commitment values using a commitment value map included in the signature for the document at block 730. For example, the signature for the document can include the commitment value map and a set of intermediate hash values, and the commitment values and set of intermediate hash values can be arranged within a binary hash tree (e.g., a Merkle tree) using the commitment value map and other information about the intermediate hash values as discussed above in relation to FIG. 4.

A signature value for the document is then generated using the commitment values according to the order and intermediate hash values for the document at block 740. For example, process 700 can generate (or calculate) a signature value for the document by ascending the binary hash tree discussed in relation to block 730. At each sub-root node above the leaf nodes and nodes assigned a value from the set of intermediate hash values, intermediate hash values are generated by combining the values (i.e., intermediate hash values) at the child nodes of that node as input to a hash function. The output of the hash function is the intermediate hash value for that node. The intermediate hash value at the root of the binary hash tree is then used to verify (or validate) the document (or the signature for the document).

For example, the intermediate hash value at the root of the binary hash tree can be submitted with the signature value from the signature of the document to a verification process of a digital signature scheme. The verification process indicates whether the document is verified. That is, the verification process determines whether the signature is valid for the document. A valid signature for the document indicates the document has not been modified other than by permissible redaction, such as the redaction discussed above in relation to FIG. 4.

As a simple example of a verification process of a digital signature scheme, the signature value for the signature of the document can be an intermediate hash value that has been encrypted using a private key of a public/private key pair. The verification process can decrypt the signature value for the signature of the document, and compare the decrypted signature value (in this example, an intermediate hash value) with the intermediate hash value at the root of the binary hash tree discussed above. If the intermediate signature value at the root of the binary hash tree generated at block 740 matches or satisfies the decrypted signature value from the signature for the document, the document can be verified. In other words, the signature (or signature value) can be determined to be valid for the document.

In other implementations, a signature for a document can include additional portions or components. For example, a signature for a document can include pre-computed hash values for subdocuments, and those pre-computed hash values can be compared with hash values computed for subdocuments during process 700 to verify the document and the signature for the document. Moreover, a commitment value map can include references to such pre-computed hash values. For example, each entry of a commitment value map can include references to pre-computed hash values associated with the commitment value represented by that entry. These pre-computed hash values can be used to generate that commitment value (e.g., provided with a random value to a hash function).

FIGS. 8A-8I are an illustration of a redactable document signature process, according to an implementation. The redactable document signature process shown in FIGS. 8A-8I is an example to illustrate some features of various implementations discussed herein.

FIG. 8A illustrates document 800, which includes a sequence of five subdocuments. Subdocument 1 810 is the first subdocument in the sequence, subdocument 2 820 is the second subdocument in the sequence, subdocument 3 830 is the third subdocument in the sequence, subdocument 4 840 is the fourth subdocument in the sequence, and subdocument 5 850 is the fifth subdocument in the sequence. As discussed, a document can be, for example, a file within a memory and subdocuments can be portions or sections of such a file.

FIG. 8B illustrates a graph representation of subdocuments of document 800. Node SD1 represents subdocument 1 810, node SD2 represents subdocument 2 820, node SD3 represents subdocument 3 830, node SD 4 represents subdocument 4 840, and node SD5 represents subdocument 5 850. In the example shown in FIG. 8B, document 800 (or subdocuments of document 800) is represented as a graph in which the edges are directed from previous nodes in the sequence to subsequent nodes in the sequence. In other implementations, other graph representations of a document such as those discussed below in relation to FIG. 9 can be used.

The graph representation of document 800 illustrated in FIG. 8B is used to select subdocument pairs of the subdocuments of document 800 that will be used to generate commitment values for document 800. That is, each subdocument pair that is joined in the graph representation of document 800 is used to generate a commitment value for document 800.

FIG. 8C illustrates table T10, which is a table representation of a commitment value map. The column of table T10 labeled "PAIR" includes identifiers of the subdocument pair (here, with reference to the nodes of the graph representation of document 800 illustrated in FIG. 8B) from which a commitment value will be generated. Thus, for example, the commitment value associated or represented by the first row of table T10 will be generated using subdocument 1 810 and subdocument 2 820.

Additionally, table T10 (i.e., a commitment value map) identifies a position in an order of each commitment value in the column labeled "POSITION". As discussed above, the order can be defined for the commitment values and dummy values. The order can be defined using a variety of methodologies. For example, the number of commitment values and dummy values that will be generated can be determined, and a position in the order for each commitment value can be selected randomly between zero and one less than that number (or between one and that number). In this example, the collective number of commitment values and dummy values is selected as 16, which is the next whole number that is a power of two and is larger than 10—the number of subdocument pairs from the graph representation of document 800 illustrated in FIG. 8B from which commitment values will be generated.

As another example, a bit vector can be generated in which zero and one are randomly distributed with a Hamming weight (e.g., number of ones) equal to the number of dummy values for the document. The commitment values can be randomly positioned in an order of the commitment values and dummy values. The position of each commitment value in the order can then be defined as the index of the $n^{th}$ zero value in the bit vector, where n is the position of that commitment value in the rearranged sequence.

For the example illustrated in FIG. 8C, such a bit vector is 0100100111100000 and the random order of the commitment values is: (SD2, SD3), (SD1, SD3), (SD3, SD5), (SD3, SD4), (SD1, SD2), (SD1, SD5), (SD4, SD5), (SD2, SD4), (SD2, SD5), and (SD1, SD4), where (X, Y) indicates the commitment value generated for subdocument X and Y. Accordingly, in the order of the commitment values and dummy values, the commitment value generated for subdocuments SD1 and SD2 (subdocument 1 810 and subdocument 2 820, respectively) is in the sixth position (zero-based) in the order (the position of the fifth zero in the bit vector) and the commitment value generated for subdocuments SD2 and SD5 is in the fourteenth position (zero-based) in the order (the position of the ninth zero in the bit vector). Positions of dummy values in the order are assigned according to the indexes of the ones in the bit vector. Thus, dummy values are in the first, fourth, seventh, eighth, ninth, and tenth (zero-based) positions in the order of the commitment values and dummy values.

In this example, commitment values are generated as hash values of subdocument pairs and random values and dummy values are generated using a hash function and random values. In some implementations, commitment values are generated as hash values of subdocument pairs by providing the subdocuments of the subdocument pairs, and in some implementations a random value, to a hash function. In other implementations, commitment values are generated as hash values of subdocument pairs by providing each subdocument of subdocument pair to a hash function to generate a hash value for that subdocument. The hash value for each subdocument of the subdocument pair is then provided, in some instances with a random value, to a hash function to generate a commitment value for that subdocument pair.

Figure 8D:
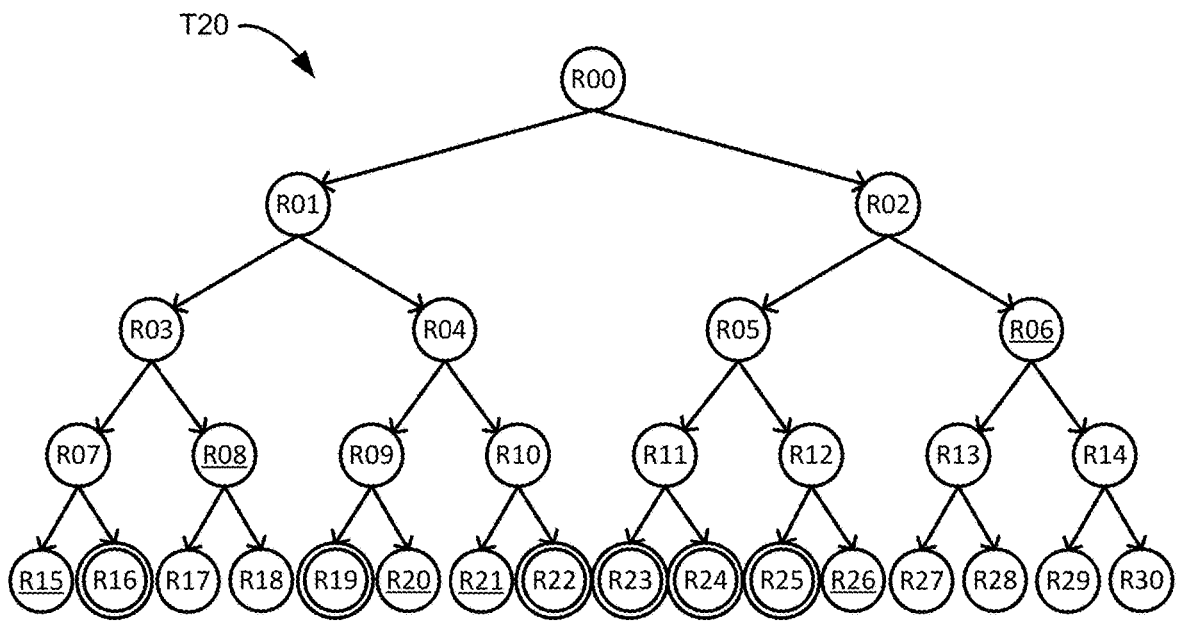

In this example, random values are generated using binary tree T20 (e.g., a GGM tree) illustrated in FIG. 8D. Binary tree T20 includes 16 leaf nodes R15-R30. Thus, a random value at a leaf node is used to generate each commitment value and each dummy value. Said differently, a unique random value is used to generate each commitment value and each dummy value.

Random values can be generated using a binary tree structure by assigning a random value to the root node (here, node R00) and generating random values for the children of the root node (here, nodes R01 and R02) by applying a length-doubling pseudorandom number generator (or pseudorandom function construction) to the root node. As a specific example, one or more hash functions can be applied to the random value assigned to the root node. These operations can be applied at each sub-root descending binary tree T20 such as in a GGM tree.

The random values of leaf nodes of binary tree T20 illustrated in single-lined circles are used to generate commitment values, and the random values of leaf nodes of binary tree T20 illustrated double-lined circles are used to generate dummy values. The random value used to generate a particular commitment value is selected using the position of that commitment value in the order discussed above in relation to FIG. 8C.

For example, the random value used to generate the commitment value for subdocument 1 810 and subdocument 2 820 is the random value of leaf node R21, which is the sixth leaf node (zero-based, increasing from leaf node R15 to leaf node R30). As another example, the random value used to generate the commitment value for subdocument 4 840 and subdocument 5 850 is the random value of leaf node R27, which is the twelfth leaf node. In other words, the random value used to generate a commitment value is the random value for the $n^{th}$ leaf node in binary tree T20, where n is the position of that commitment value in the order.

The nodes of binary tree T20 with underlined identifiers identify the nodes with values that cover the random values used to generate the commitment values for document 800. In other words, the random values of nodes R15, R08, R20, R21, R26, and R06 (which covers R13 and R14 and, therefore, covers R27-R30) are a set of values that cover the random values used to generate the commitment values for document 800. For nodes R15, R20, R21, and R26, these values are the random values directly used to generate commitment values.

For nodes R08 and R06, these values represent the random values used to generate commitment values. That is, the values related to (or associated with) nodes R17, R18, and R27-R30 can be generated from the values at nodes R08 and R06 as discussed above. Specifically, for example, the random value used to generate commitment values for subdocument 4 840 and subdocument 5 850 and subdocument 2 820 and subdocument 4 840 (i.e., the random values at leaf nodes R27 (position 12) and R28 (position 13), respectively) can be generated as follows. One or more hash functions or a pseudorandom number generator can be applied to the value of node R06 to generate the values of nodes R13 and R14 as discussed above. One or more hash functions or a pseudorandom number generator can then be applied the value of node R13 as discussed above to generate the values at nodes R27 and R28. In some implementations a signature can include additional information about such a set of values such as indexes or other identifiers of the location or position of such values within a binary tree.

Figure 8E:
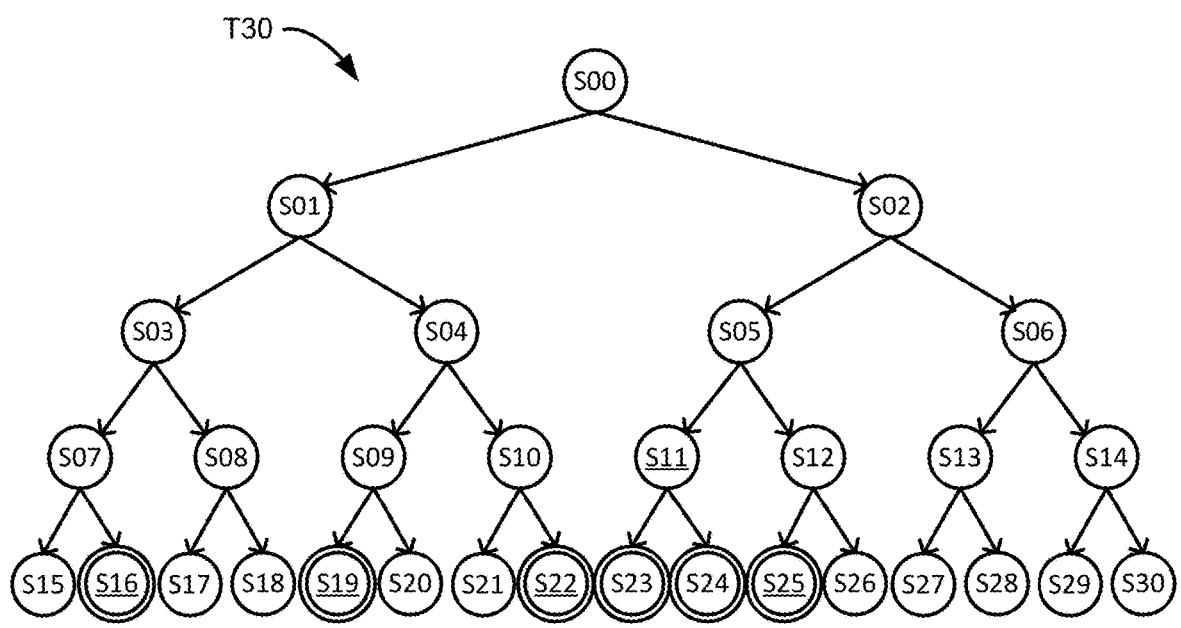

FIG. 8E illustrates a binary hash tree used to generate an intermediate value for document 800. The leaf nodes of binary hash tree T30 illustrated in single-lined circles are associated with commitment values, and the leaf nodes of binary hash tree T30 illustrated as double-lined circles are associated with dummy values. Commitment values are generated for the subdocument pairs as specified in the commitment value map illustrated in FIG. 8C using the random values from binary tree T20 as discussed above. Accordingly, the commitment values and dummy values are in a sequence at the leaf nodes of binary hash tree T30 according to the order discussed above in relation to FIG. 8C. As a specific example, the commitment value for leaf node S15 (position 0) is generated from subdocument 2 820 and subdocument 3 830 and the random value of leaf node R15 (also position 0) of binary tree T20.

Dummy values are generated using the random values at leaf nodes in binary tree T20 corresponding to the leaf nodes in binary hash tree T30 associated with those dummy values. As a specific example, the dummy value for leaf node S22 is generated using the random value of leaf node R22 of binary tree T20. As discussed above, the dummy values and commitment values are intermediate hash values for generating a signature value for document 800.

A signature value for document 800 can then be generated by ascending binary hash tree T30, generating an intermediate hash values for each sub-root node of binary hash tree T30 by the intermediate hash values of the child nodes of that sub-root node. For example, the intermediate hash values of the child nodes of each sub-root node can be input to a hash function to generate an intermediate hash value for that sub-root node. As a specific example, the intermediate hash values of nodes S15 and S16 can be input to a hash function to generate an intermediate hash value for sub-root node S07. The signature value for document 800 is generated from the intermediate hash value at root node S00 of binary hash tree T30 using a signing process of a digital signature scheme as discussed above.

The nodes of binary hash tree T30 with underlined identifiers identify the leaf nodes with intermediate hash values that cover the dummy values for document 800. In other words, because intermediate hash values are generated by ascending binary hash tree T30, an intermediate hash value at a sub-root node with child leaf nodes that are exclusively dummy values can represent those child leaf nodes to verify the signature value for document 800. In some implementations a signature can include additional information about such intermediate hash values such as indexes or other identifiers of the location or position of such values within a binary hash tree.

A signature for document 800 includes the signature value generated using binary hash tree T30, the set of intermediate hash values that cover the dummy values for document 800 (here, the set of intermediate hash values is the intermediation signature values for nodes S16, S19, S22, S11, and S25 of binary hash tree T30), the set of values that cover the random values used to generate the commitment values for document 800 (here, the set of values is the values at nodes R15, R08, R20, R21, R26, and R06 of binary tree T20), and the commitment value map illustrated in FIG. 8C. This signature can be modified to redact subdocuments of document 800, and to verify that document 800 has been unchanged other than proper redaction.

Figure 8F:
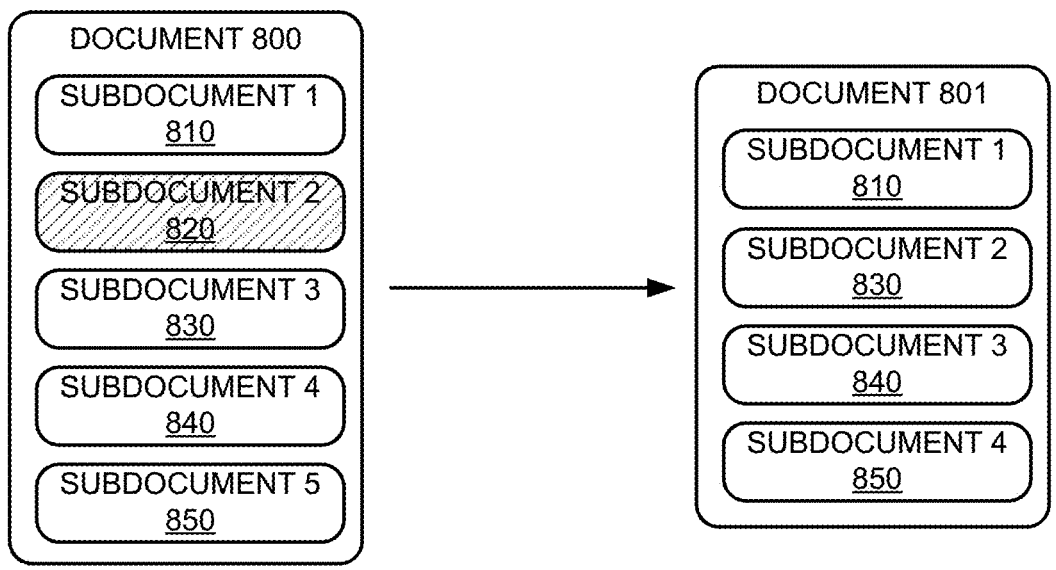

FIG. 8F illustrates redaction of subdocument 2 820 from document 800. As illustrated in FIG. 8F, subdocument 2 820 is identified for redaction from document 800. After subdocument 2 820 is redacted, document 800 includes the subdocuments illustrated in document 801. Note that the subdocument 3 830, subdocument 4 840, and subdocument 5 850 have been renamed in document 801 to indicate that subdocument 2 820 has been removed. That is, subdocument 3 830 is now the second subdocument in document 801, and is labeled subdocument 2 830. Similarly, subdocument 4 840 is now the third subdocument in document 801, and is labeled subdocument 3 840; and subdocument 5 850 is now the fourth subdocument in document 801, and is labeled subdocument 4 850.

Figure 8G:
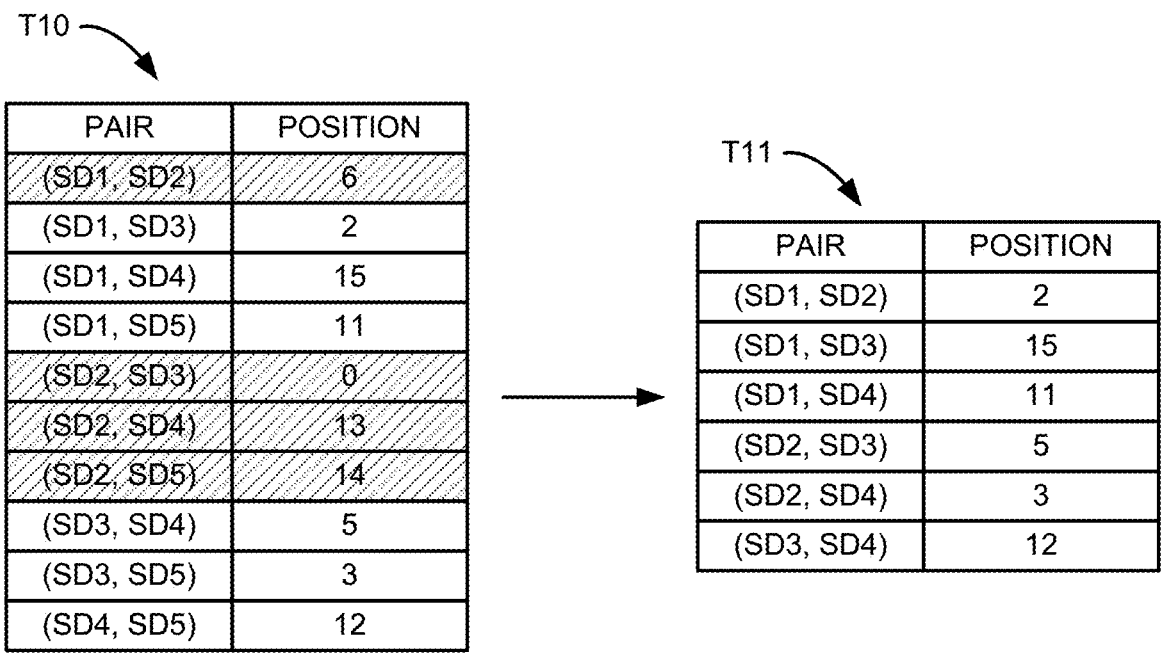

FIG. 8G illustrates updates (or modifications) to the commitment value map represented as table T10 to redact subdocument 2 820 from document 800. The entries in the commitment value map (in this example, rows of table T10) associated with subdocument 2 820 from document 800. Specifically in this example, SD2 identifies subdocument 2 820 from document 800 in table T10. Accordingly, all rows including SD2 are removed from table T10 to update the commitment value map for redacting subdocument 2 820 from document 800. Table T11 is the updated representation of the commitment value map. Similar to FIG. 8F, the subdocuments have been renumbered or labeled in table T11 to reference the subdocuments of document 801. More specifically, SD1 represents (or identifies) subdocument 1 810, SD2 represents subdocument 2 830, SD3 represents subdocument 3 840, and SD4 represents subdocument 4 850.

Figure 8H:
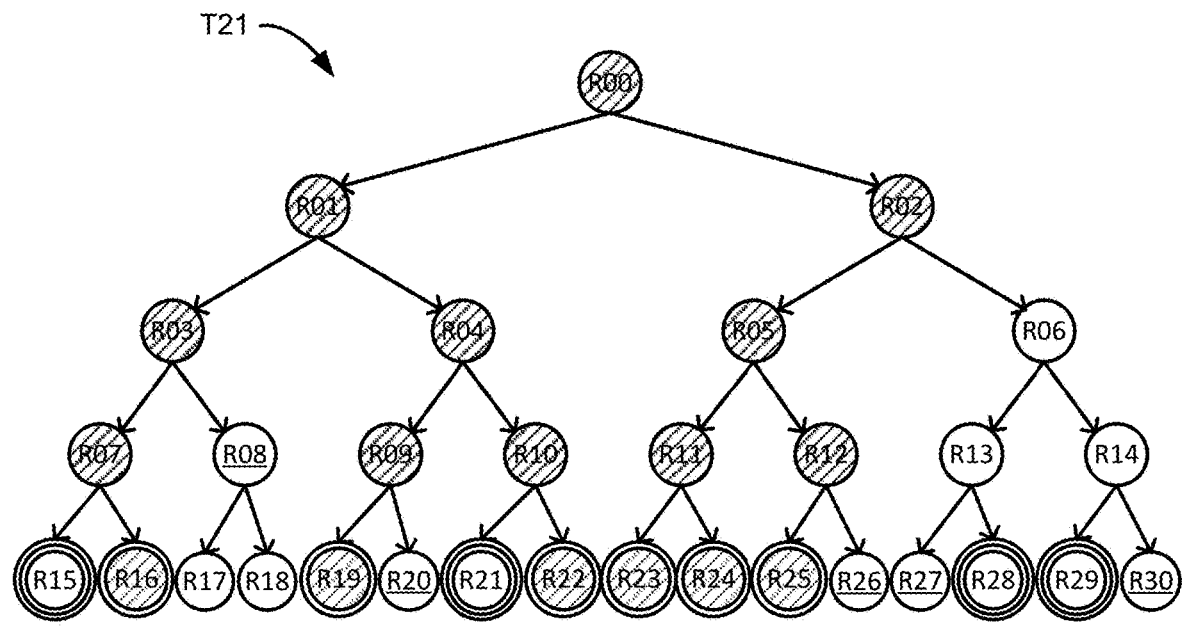
Figure 8I:
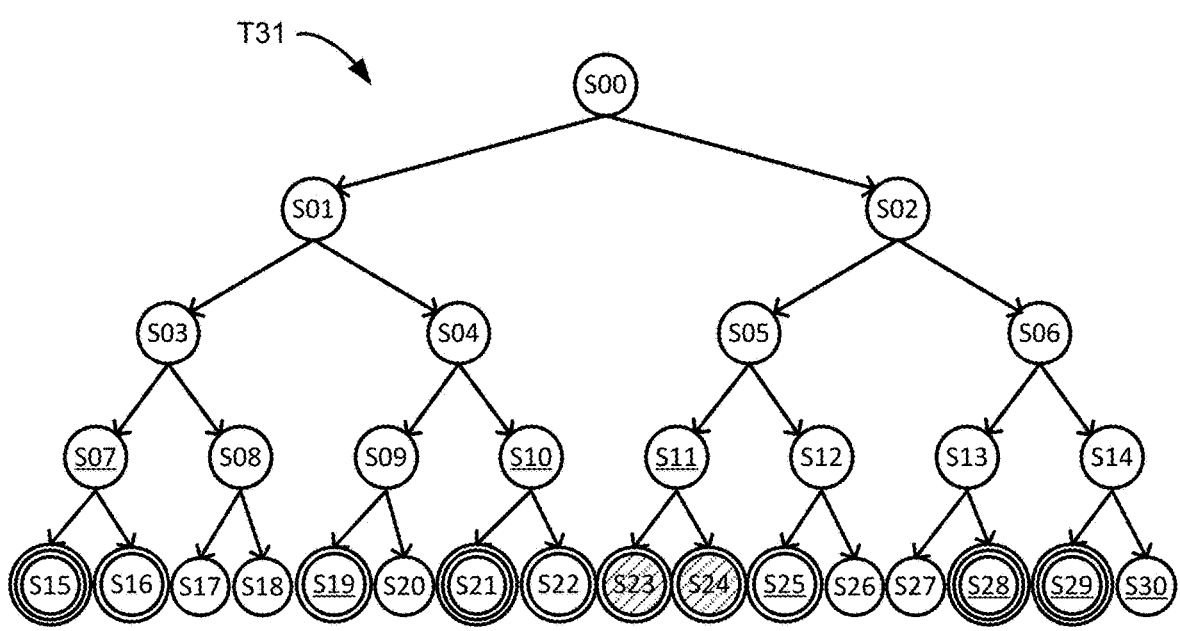

FIG. 8H illustrates removal of values related to subdocument 2 820 from the set of value in the signature for document 800. In the example illustrated in FIG. 8H, the portion of binary tree T21 with nodes that do not include hatching is reconstructed from the set of covering values for the random values used to generate commitment values for document 800 (i.e., the set of values that covers the random values used to generate commitment values for document 800) that were included in the signature for document 800. Specifically, in this example, the set of values that covers the random values used to generate commitment values for document 800 is the values at nodes R15, R08, R20, R21, R26, and R06 from binary tree T20 (also of binary tree T21). These values are used to populate the portion of binary tree T21 with nodes that do not include hatching (i.e., nodes R15, R17, R18, R20, R21, and R26-R30). The values at nodes R15, R20, R21, and R26 can be accessed directly. The values at nodes R13 and R14 can be derived (or generated) from the value at node R06 and the values at nodes R17 and R18 can be derived from the value at node R08 using, for example, a hash function as discussed above. Additionally, the values at nodes R27 and R28 can be derived from the value at node R13, and the values at nodes R29 and R30 can be derived from the value at node R14.

The random values of leaf nodes of binary tree T21 that do not include hatching are used to generate commitment values. More specifically, the commitment value map represented by table T10 and these leaf nodes of binary tree T21 are used to generate commitment values (e.g., as discussed above in relation to FIG. 8E) for leaf nodes S15, S17, S18, S20, S21, S22, and S26-S30 of binary hash tree T31 illustrated in FIG. 8I. The set of intermediate hash values included in the signature for document 800 includes intermediate hash values for nodes S16, S19, S22, S11, and S25 of binary hash tree T31. Although the dummy values for leaf nodes S23 and S24 of binary hash tree T30 illustrated in FIG. 8E (the corresponding leaf nodes of binary tree T31 are illustrated with hatching) cannot be reconstructed from the information currently available (i.e., it is computationally infeasible to generate the dummy values assigned to these leaf nodes in binary hash tree T30), these intermediate hash values and commitment values sufficiently populate binary hash tree to allow verification of document 800. That is, binary hash tree T31 can be ascended as discussed in more detail above to generate an intermediate hash value for root node S00.

This intermediate hash value can be provided to a verification process for a digital signature scheme with the signature value of the signature for document 800 as discussed above. If the verification process determines that the intermediate hash value satisfies the signature value (e.g., the signature value was generated by encrypting an intermediate hash value that is the same as the intermediate signature value for root node S00), document 800 can be said to be verified.

To complete redaction of subdocument 2 820 from document 800, the nodes of binary tree T21 and binary hash tree T31 that correspond to the positions of commitment values that are removed from the commitment value map represented by table T10 are handled or processed as nodes of binary tree T20 and binary hash tree T30 that are related to dummy values in FIGS. 8D and 8E above. These nodes—nodes R15, R21, R28, and R29 of binary tree T21 and nodes S15, S21, S28, and S29 of binary tree T31—are illustrated as triple-lined circles. For binary tree T21, the set of values included in the signature for document 800 is modified to exclude values that cover the random values used to generate commitment values for subdocument 2 820, which is identified for redaction from document 800. Specifically, the values of nodes R15, R21, and R06 are removed from the set of values and the values of nodes R27 and R30 are added to the set of values. As a result, the set of values at binary tree T21 that cover the random values used to generate commitment values is the values of nodes R08, R20, R26, R27, and R30 of binary tree T21.

Similarly, the set of intermediate hash values from the signature for document 800 is modified to include intermediate hash values that cover that set of intermediate hash values and the nodes of binary hash tree T31 associated with subdocument 2 820 that is identified for redaction from document 800. That is, the set of intermediate hash values from the signature for document 800 is modified to include intermediate hash values that cover dummy values (such intermediate hash values were included in the signature of document 800) and commitment values for subdocuments identified for redaction from document 800. Accordingly, intermediate hash values for nodes S16 and S22, of binary hash tree T31 are removed from and intermediate hash values for S07, S10, S28, and S29 of binary hash tree T31 are added to the set of intermediate hash values for document 801. As a result, the set of intermediate hash values for document 801 is the intermediate hash values of nodes S07, S19, S10, S11, S25, S28, and S29 of binary hash tree T31.

The signature for document 801 then includes the signature value (i.e., the signature value for document 800), the set of intermediate hash values that cover the set of intermediate hash values for document 800 and the nodes of binary hash tree T31 associated with subdocument 2 820 (here, the set of intermediate hash values is the intermediate hash values for nodes S07, S19, S10, S11, S25, S28, and S29 of binary hash tree T31), the set of values that cover the random values used to generate the commitment values for document 801 (here, the set of values is the values at nodes R08, R20, R26, R27, and R30 of binary tree T21), and the commitment value map represented by table T11 illustrated in FIG. 8G.

Figure 9:
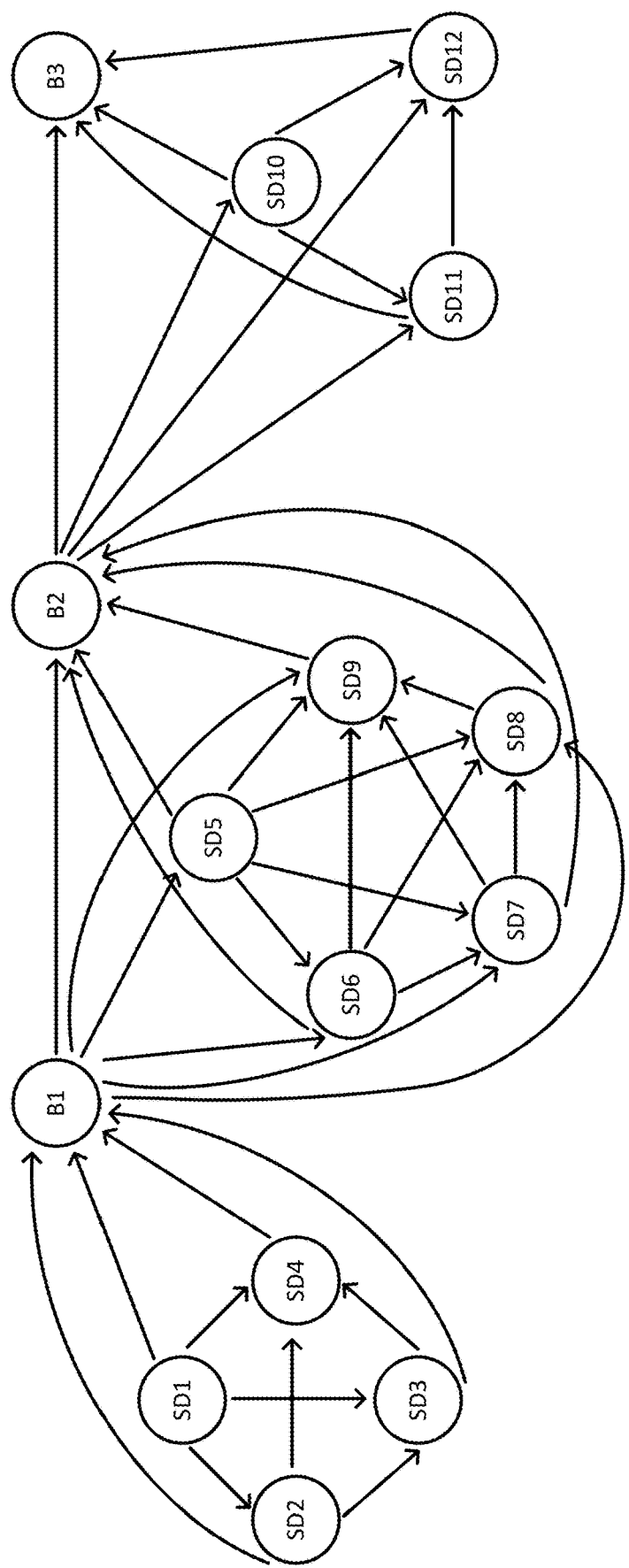
FIG. 9 is an illustration of a graph representation of subdocuments of a document for selecting subdocument pairs, according to an implementation.

FIG. 9 is an illustration of a graph representation of subdocuments of a document for selecting subdocument pairs, according to an implementation. The document represented in FIG. 9 includes 12 subdocuments represented by nodes SD1-SD12. As discussed here, references to subdocuments SD1-SD12 should be understood to refer to nodes SD1-SD12, which represent subdocuments. Three bridge nodes, labeled B1, B2, and B3 are used to connect groups of subdocuments SD1-SD12. Additionally, the graph representation includes edges (illustrated as arrowed lines) connecting nodes representing subdocuments and bridge nodes. In the example illustrated in FIG. 9, the graph representation does not form a subgraph of the bridge nodes in which each node is connected to each other node by an edge. In other implementations, the graph representation can form such a subgraph of the bridge nodes.

Subdocument pairs can be selected along each edge connecting two subdocuments for generating commitment values. That is, each subdocument pair includes subdocuments that are connected by an edge in the graph representation illustrated in FIG. 9, with the subdocument from which the edge is directed (i.e., the subdocument opposite the arrowed end) being first in an order of the two subdocuments in that subdocument pair.

Additionally, commitment values can be generated for subdocument and bridge node pairs connected by an edge. In other words, a subdocument pair can be defined for a subdocument and a bridge node connected by an edge in the graph representation. In some implementations, a predetermined value for a bridge node can be input with a subdocument sharing an edge with that bridge node to a hash function to generate a commitment value for that subdocument and bridge node pair. The predetermined value for the bridge node can also be included in the signature of the document, or can be determined using other methodologies.

Moreover, dummy values, a commitment map, and other information can be generated for the document represented by the graph representation as discussed above. Such commitment values, dummy values, commitment map, and other information can then be used as discussed above in various implementations to generate a signature for the document represented by the graph representation.

Graph representations of documents such as that illustrated in FIG. 9 can reduce the number of commitment values for a document, while sufficiently encoding order information about the subdocuments in the document to satisfy verification and security requirements of a redactable document signature system. The reduction in the number of commitment values for a document is due to fewer edges in the graph representation illustrated in FIG. 9 than graphs that include an edge between each subdocument pair of the document. As specific examples, for a document with 12 subdocuments, such a graph of those subdocuments would result in 66 edges and, therefore, 66 commitment values. Using the graph representation of FIG. 9, the document with 12 subdocuments results in 41 edges and, therefore, 41 commitment values. Although the difference between the graph representation of FIG. 9 and such a graph representation of a document with the same number of subdocuments is small in the example discussed herein, the reduction in the number of commitment values of the graph representation of FIG. 9 becomes more significant as the number of nodes (i.e., nodes representing subdocuments or bridge nodes) increases.

As used herein, the term "engine" refers to a combination of hardware (e.g., a processor such as an integrated circuit or other circuitry) and software (e.g., programming such as machine- or processor-executable instructions, commands, or code such as firmware, programming, or object code). A combination of hardware and software includes hardware only (i.e., a hardware element with no software elements such as an ASIC), software hosted at hardware (e.g., a software module that is stored at a processor-readable memory such as RAM, a hard-disk or solid-state drive, resistive memory, or optical media such as a DVD and/or executed or interpreted at a processor), or hardware and software hosted at hardware.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As an example, functionalities discussed above in relation to specific modules or elements can be included at different modules, engines, or components in other implementations. As a more specific example, examples of engines discussed herein as implemented as modules stored at a non-transitory memory and/or hosted at a processor can be implemented as circuitry or logic in hardware. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the singular forms "a," "an," and "the" include plural referents unless the context clearly dictates otherwise. Thus, for example, the term "module" is intended to mean one or more modules or a combination of modules. Furthermore, as used herein, the term "based on" means "based at least in part on." Thus, a feature that is described as based on some cause, can be based only on the cause, or based on that cause and on one or more other causes. Similarly, as used herein, the term "using" means "using at least". Accordingly, for example, an operation described as using some operand, can use only that operand or use that operand and one or more additional operands.

What is claimed is:

1. A redactable document signature system, comprising:
an encoding engine to access a plurality of subdocuments of a document,
to generate a plurality of commitment values from the plurality of subdocuments, and
to generate a plurality of dummy values, each dummy value indistinguishable from a commitment value;
a reordering engine to define an order of the plurality of commitment values and the plurality of dummy values independent of an order of the subdocuments;
a signature engine to calculate a signature value for the document using the plurality of commitment values and the plurality of dummy values according to the order; and
a redaction engine to redact a subdocument from the plurality of subdocuments using a commitment value map, wherein the commitment value map includes a table that lists a plurality of pairs of subdocuments based on edges in a graphical representation of the plurality of subdocuments from which the commitment values are generated, and wherein redaction of the subdocument includes removing a row from the table that is associated with the subdocument to be redacted.

2. The system of claim 1, wherein each commitment value from the plurality of commitment values is associated with a subdocument pair from the plurality of subdocuments and is generated using that subdocument pair, the system further comprising a random value engine to generate a set of random values for the plurality of commitment values and the plurality of dummy values,
the encoding engine generates the commitment value associated with each subdocument pair from the plurality of subdocuments using that subdocument pair and a random value from the set of random values,
the encoding engine generates each dummy value from the plurality of dummy values using a random value from the set of random values.

3. The system of claim 1, wherein each commitment value from the plurality of commitment values is associated with a subdocument pair from the plurality of subdocuments and is generated using that subdocument pair, the system further comprising a random value engine to generate a set of random values for the plurality of commitment values and the plurality of dummy values,
the encoding engine generates the commitment value associated with each subdocument pair from the plurality of subdocuments using that subdocument pair and a random value from the set of random values,
the encoding engine generates each dummy value from the plurality of dummy values using a random value from the set of random values;
the signature engine is configured to define a signature for the document including the signature value, a set of intermediate hash values derived from the dummy values, a set of values that cover the random values from the set of random values used to generate the plurality of commitment values, and the commitment value map.

4. The system of claim 1, wherein the signature engine calculates the signature value using a hash tree with the plurality of commitment values and the plurality of dummy values assigned to leaves of the hash tree.

5. A non-transitory processor-readable medium storing code representing instructions that when executed at a processor cause the processor to:
select a plurality of subdocument pairs from subdocuments of a document;
generate a plurality of commitment values for the document, each commitment value generated using a subdocument pair from the plurality of subdocument pairs;
generate a plurality of dummy values for the document, each dummy value indistinguishable from each commitment value from the plurality of commitment values;
define an order of the plurality of commitment values and the plurality of dummy values independent of an order of the subdocuments in the subdocument pair used to generate each commitment value from the plurality of commitment values; and calculate a signature value for the document using the plurality of commitment values and the plurality of dummy values according to the order; and redact a subdocument from the plurality of subdocuments using a commitment value map, wherein the commitment value map includes a table that lists the plurality of subdocument pairs based on edges in a graphical representation of the plurality of subdocuments from which the commitment values are generated, and wherein redaction of the subdocument includes removing a row from the table that is associated with the subdocument to be redacted.

6. The non-transitory processor-readable medium of claim 5, further comprising code representing instructions that when executed at the processor cause the processor to:

define the commitment value map identifying for each commitment value from the plurality of commitment values the subdocuments in the subdocument pair used to generate that commitment value and a position of that commitment value in the order.

7. The non-transitory processor-readable medium of claim 5, further comprising code representing instructions that when executed at the processor cause the processor to:

generate a set of random values, each commitment value from the plurality of commitment values generated using a subdocument pair from the plurality of subdocument pairs and a unique random value from the plurality of random values, each dummy value from the plurality of dummy values generated using a unique random value from the plurality of random values.

8. The non-transitory processor-readable medium of claim 5, wherein the subdocument pairs are selected according to the edges of an order-preserving graph with nodes representing the subdocuments of the document.

9. The non-transitory processor-readable medium of claim 5, wherein the subdocument pairs are selected according to the edges of an order-preserving graph with nodes representing the subdocuments of the document, the order-preserving graph including at least one bridge node connecting groups of nodes representing subdocuments of the document.

10. A document redaction method, comprising:

identifying, using a commitment value map for a document, a position in an order for a first plurality of commitment values and a plurality of dummy values for each commitment value from a second plurality of commitment values associated with a subdocument identified for redaction from the document, wherein the document includes a plurality of subdocuments, wherein the second plurality of commitment values are included in the first plurality of commitment values, wherein the commitment value map includes a table that lists a plurality of pairs of subdocuments based on edges in a graphical representation of the plurality of subdocuments from which the commitment values are generated;

redacting a subdocument from the plurality of subdocuments using the commitment value map;

updating the commitment value map to remove, from the commitment value map, each entry associated with the subdocument identified for redaction from the document; and inserting, based on the identifying, intermediate hash values derived from each commitment value from the second plurality of commitment values into a set of intermediate hash values for the document.

11. The method of claim 10, further comprising:

receiving, before the updating and the inserting, the document, a set of values associated with the document that cover a set of random values, the set of intermediate hash values, and the commitment value map.

12. The method of claim 10, further comprising:

generating commitment values from the first plurality of commitment values using subdocument pairs from a plurality of subdocuments of the document; and calculating, according to the order, a signature value for the document using the commitment values and the set of intermediate hash values.

13. The method of claim 10, further comprising:

updating a set of values associated with the document that cover a set of random values to exclude values that cover random values from the set of random values associated with the second plurality of commitment values.

14. The method of claim 10, further comprising:

updating a set of values associated with the document that cover a set of random values to exclude values that cover random values from the set of random values associated with the second plurality of commitment values;

generating commitment values from the first plurality of commitment values using subdocument pairs from a plurality of subdocuments of the document and random values from a set of random values associated with the document; and calculating, according to the order, a signature value for the document using the commitment values and the set of intermediate hash values.

15. The method of claim 10, further comprising:

updating a set of values associated with the document that cover a set of random values to exclude values that cover random values from the set of random values associated with the second plurality of commitment values;

generating commitment values from the first plurality of commitment values using subdocument pairs from a plurality of subdocuments of the document and random values from a set of random values;

calculating, according to the order, a signature value for the document using the commitment values and the set of intermediate hash values; and outputting, after updating the commitment value map and updating the set of values, the document excluding the subdocument identified for redaction from the document and a signature for the document, the signature including the signature value, the set of values, the set of intermediate hash values, and the commitment value map.

* * * * *